United States Patent
Salfelner (10) Patent No.: US 7,349,678 B2
(45) Date of Patent: Mar. 25, 2008

(54) CIRCUIT ARRANGEMENT FOR TRANSMITTING AND RECEIVING RADIO SIGNALS SIMULTANEOUSLY

(75) Inventor: Anton Salfelner, Pernegg (AT)

(73) Assignee: Infineon Technologies AG, Munich (DE)

( * ) Notice: Subject to any disclaimer, the term of this patent is extended or adjusted under 35 U.S.C. 154(b) by 355 days.

(21) Appl. No.: 10/784,132

(22) Filed: Feb. 20, 2004

(65) Prior Publication Data

US 2004/0166806 A1    Aug. 26, 2004

(30) Foreign Application Priority Data

Feb. 21, 2003   (DE)   ................. 103 07 426

(51) Int. Cl.
*H04B 1/04* (2006.01)
(52) U.S. Cl. .................... 455/127.1; 455/127.2; 455/84; 455/343.1; 330/5
(58) Field of Classification Search ............ 455/127.1, 455/127.2, 127.3, 127.4, 127.5, 126, 343.1, 455/343.5, 82, 84; 330/5; 370/335
See application file for complete search history.

(56) References Cited

U.S. PATENT DOCUMENTS

| | | | | |
|---|---|---|---|---|
| 3,636,461 A | * | 1/1972 | Sterzer ........................... 330/5 |
| 3,988,655 A | * | 10/1976 | Sherwood ................. 455/127.1 |
| 5,119,042 A | * | 6/1992 | Crampton et al. ........ 455/127.3 |
| 5,826,170 A | * | 10/1998 | Hirschfield et al. ....... 455/127.1 |
| 6,091,934 A | * | 7/2000 | Berman et al. ........... 455/127.1 |
| 6,094,428 A | * | 7/2000 | Bruckert et al. ............ 370/335 |
| 6,177,858 B1 | * | 1/2001 | Raimbault et al. .......... 455/126 |
| 6,298,222 B1 | * | 10/2001 | Bergveld et al. ......... 455/127.5 |
| 6,556,815 B1 | * | 4/2003 | Shibamura .................. 455/126 |
| 6,580,901 B1 | * | 6/2003 | Mochizuki ............... 455/127.1 |
| 6,708,022 B1 | * | 3/2004 | Kurokawa et al. .......... 455/126 |
| 6,943,618 B1 | * | 9/2005 | Tanji et al. .............. 455/127.1 |
| 6,998,912 B2 | * | 2/2006 | Kushitani et al. ............. 330/51 |
| 7,116,947 B2 | * | 10/2006 | Tanabe et al. ................ 455/91 |
| 2002/0045995 A1 | * | 4/2002 | Shimazaki et al. ....... 455/127.3 |
| 2007/0026823 A1 | * | 2/2007 | Eisenhut et al. ......... 455/127.1 |

FOREIGN PATENT DOCUMENTS

DE    4238282 A1    5/1994
DE    19805963 C2   9/1999

OTHER PUBLICATIONS

English language abstract of German language document DE 19805963 C2.
English language abstract of German language document DE 4238282 A1.

* cited by examiner

*Primary Examiner*—Lana Le
(74) *Attorney, Agent, or Firm*—Eschweiler & Associates, LLC

(57) ABSTRACT

A circuit arrangement for transmitting and receiving radio signals includes an amplification device with an output for transmitting signals, an input for receiving signals and a supply line, and an antenna for transmitting and receiving signals. The antenna is connected to the output of the amplification device. The output of the amplification device is an input for signals received via the antenna, and the supply line is an output for received signals that are converted to the supply line by the amplification device.

23 Claims, 6 Drawing Sheets

Reading Floppy Disk Drive

*(oscilloscope trace showing square wave signals)*

Channel 1: .2 ms, 2.00 V
Channel 2: .2 ms, 8.50 V

.2 ms
1  .2 V DC  BX L1.0
2  .5 V 50Ω  B L
3  .1 V DC  B L
4  50mV RC

1 AC 8.00 V

MORE DISPLAY
- Screen Sever Setup
- Color Scheme: 1 2 3 4 5 6 / U1 U2 U3 U4
- Full Screen: OFF On
- Trace color: Opaque / Transparent
- Measure Gate (highlight): OFF ON
- Data Points: Normal / Bold 258 kS/s
☐ AUTO

FIG 7

Reading Floppy Disk Drive

*(oscilloscope trace showing high-frequency signal with bursts)*

Channel 1: .2 ms, 2.00 V
Channel 2: .2 ms, 1.00 V

.2 ms
1  2 V DC  B L
2  1 V DC  B L
3  5 mV DC  B L
4  50mV AC

2 DC 8.00 V

CHANNEL 1
- Coupling: DC50Ω / Grounded / DC1.0 / Grounded / AC 1MΩ
- V/div OFFset: Normal / ECL TTL
- BWL: OFF / ? 200 MHz
- Probe Atten: X1 / x2 / x5 / x10 / x20

500 MS/s
☐ AUTO

CIRCUIT ARRANGEMENT FOR TRANSMITTING AND RECEIVING RADIO SIGNALS SIMULTANEOUSLY

FIELD OF THE INVENTION

The invention relates to transmitting and receiving radio signals.

BACKGROUND OF THE INVENTION

Circuits integrated on one chip which have a separate transmission and reception path for radio signals are called transceivers. Transceivers can be divided into two different classes depending on the area of application. Transceivers which are able to transmit radio signals and simultaneously to receive radio signals from a second transmitter are called "full duplex" transceivers. The other class does not support a full duplex mode of operation, but rather can either just transmit or receive.

Figure 9:
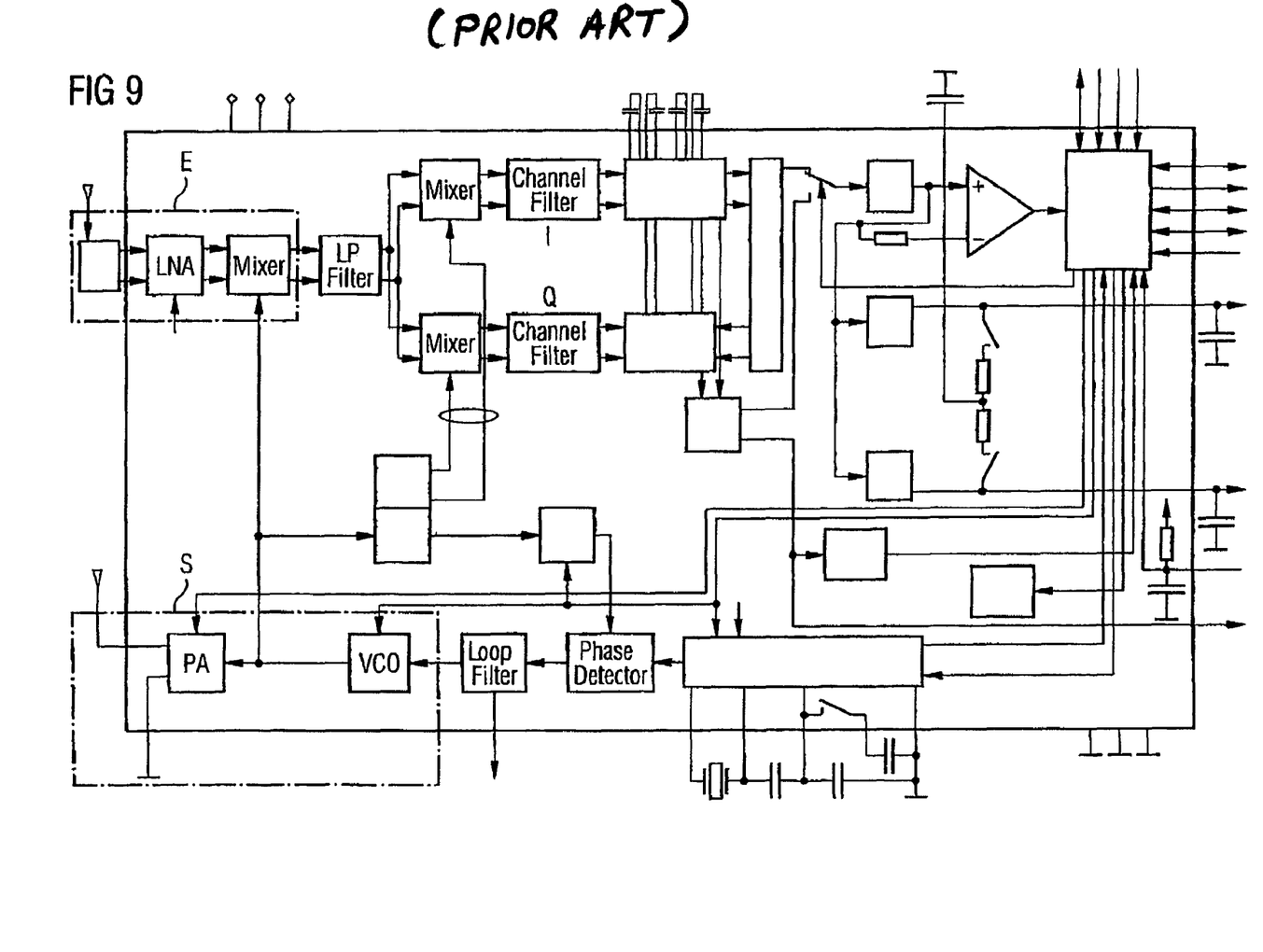
FIG. 9 shows a known arrangement for a transceiver.

An example of such a transceiver is shown in FIG. 9. In this case, the area E contains part of the reception path, the area S contains part of the transmission path. For transmitting data, an oscillator device VCO (voltage controlled oscillator) switches to a frequency $f_{TX}$. A power amplifier PA amplifies the modulated signal and transmits it using an antenna ANT in the transmission path. When data are to be received, the oscillator device VCO switches to another, second frequency $f_{Rx}$ and feeds this signal as a LO input into a device for frequency conversion MIXER in the reception path. The mixing device MIXER in the reception path E converts a received signal amplified by an amplifier LNA to an intermediate frequency $F_{IF}$. The converted signal is filtered and is supplied to an IQ demodulator for further processing. The need to switch the oscillator device VCO to different frequencies in order to transmit or receive data means that it is not possible to transmit and receive simultaneously.

It is therefore an object of the invention to provide an arrangement and a method for transmitting and receiving radio signals simultaneously.

SUMMARY OF THE INVENTION

Exemplary embodiments provide a circuit arrangement which has an amplification device and an antenna, the antenna being connected to an output of the amplification device, which output is for transmitting signals. The amplification device has an input for receiving signals which are to be amplified, and a supply line for a supply current or a supply voltage. The output of the amplification device is the input for signals received via the antenna, and the supply line is the output for these received signals converted to the power supply by the amplification device.

To transmit and receive radio signals simultaneously, the amplification device is operated in a supercritical range. At the input of the amplification device, the signal to be transmitted is applied with nondiminishing amplitude. A second, simultaneously received signal is routed to the output of the amplification device via the antenna and is converted to the supply current by virtue of the supercritical operation of the amplification device. This modulates the supply current with the received signal and allows it to be processed for further evaluation. It is advantageous for the conversion to be in the form of a modulation of a voltage drop across a subsection of the supply line.

Advantageously, the invention also makes it possible to dispense with a reception antenna, a second amplification device and a mixing device. By disconnecting the modulated transmission data, the inventive configuration can be used in a circuit which receives digitally modulated data at one time and transmits them at another time and in so doing also makes it possible to dispense with parts of the reception path.

It is of particular advantage to the reception quality if the radio signal transmitted and received comprises FSK modulated data. Another application of the invention is transmitting a signal via the antenna to a second object and measuring a reflected portion of the transmitted signal. This allows the inventive configuration to detect a change in the second object over time. This advantageously makes it possible to register any movement within the region covered by the antenna.

BRIEF DESCRIPTION OF THE DRAWINGS

The invention is explained in detail below using specific exemplary embodiments and applications with reference to the drawing, in which.

DETAILED DESCRIPTION

Figure 1:
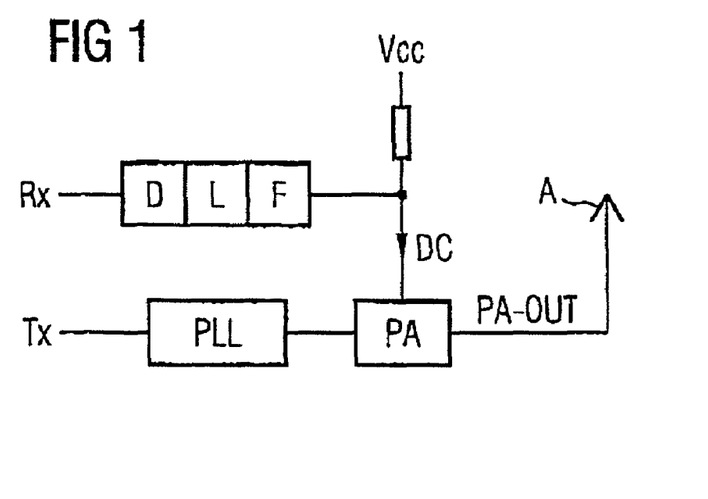
FIG. 1 shows a block diagram of the invention.

FIG. 1 shows a schematic design for the invention. The inventive circuit arrangement comprises a transmission path TX and a reception path RX. The signals to be transmitted are applied to the input of an amplification device PA via a PLL arrangement. In the present case, the amplification device is in the form of a supercritical C/E power amplifier which amplifies the signals which are to be transmitted and transmits them via the antenna A.

The receiver path RX, at the end of which the received data are processed further, has a filter device F, a limiting device L and a demodulation device D for demodulating the received signals. The input of the filter device F is connected to a DC supply line DC for the amplification device. The supply line DC has a voltage VCC for supplying the amplification device during operation.

A signal received via the antenna A is applied to the output of the amplification device PA-OUT. On account of a nonlinearity in the amplification device in a supercritical mode of operation, the current drawn is dependent on the output power of the amplification device PA. A signal carried via the antenna A into the output of the amplification device interferes with a signal coming from the amplifier. The amplifier's output power changes as a result. This process is shown in FIG. 4 by way of example.

Figure 4A:
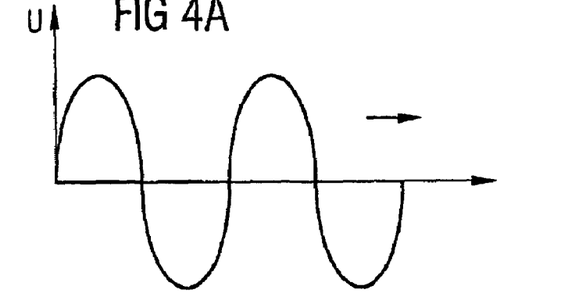
Figure 4B:
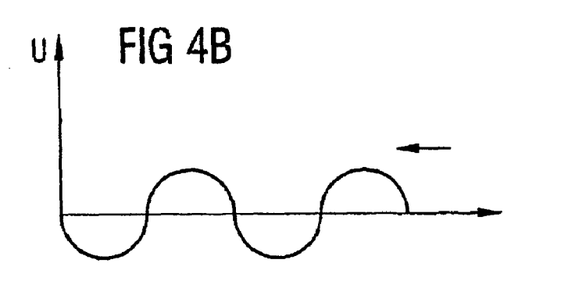

FIG. 4A shows a sinusoidal signal coming from the amplification device. The arrow direction indicates the direction of propagation of the signal. FIG. 4B shows a received signal entering the amplification device, said signal being represented by a sinusoidal wave and being phase-shifted through 180° with respect to the preceding signal.

The result is thus destructive interference (shown in FIG. 4C), in which the amplitude of the resultant wave is smaller than the amplitude of the original output signal in FIG. 4A.

Figure 4C:
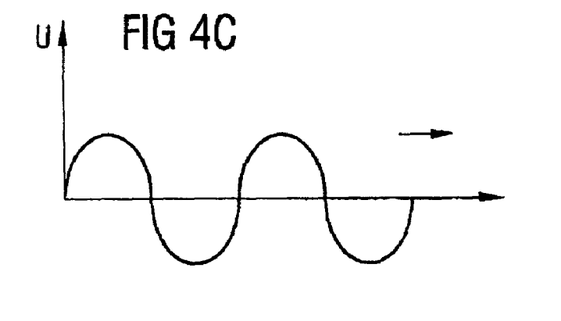

This modulates the current drawn by the amplification device in line with the received signal. When the amplification device's output power falls, the supply current rises, and when the output power rises, the supply current falls.

The process of transferring the effect of interference to the supply current is called frequency conversion to the supply current. If the received signal is a modulated signal, then the modulation is converted to the supply current by the amplification device PA. Such an example with specific frequency values can be seen in the spectral diagram in FIG. 3A. The received signal RX1 described therein has a center frequency of 434.02 MHz on the abscissa and has been modulated with a frequency shift of +/−50 kHz such that the possible binary states deviate from the center frequency by 50 kHz in the positive or negative direction.

Figure 3A:
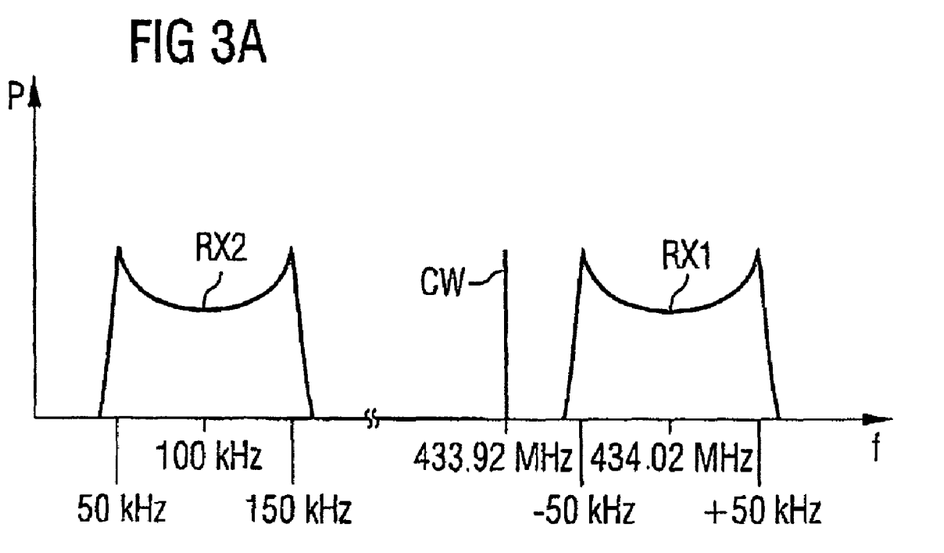
FIGS. 3A, 3B and 4A-4C show explanations of the way in which the frequency conversion works in the invention.

The signal to be transmitted by the amplification device is a monofrequency signal CW and has a center frequency of 433.92 MHz. This converts the received signal RX1 to the supply current at a center frequency of 100 kHz. Besides the DC component, the supply current has an AC component RX2 which modulates either at 50 kHz or at 150 kHz, depending on the data content. The DC component of the supply current is situated on the ordinate, identified by P. The modulation on the power supply is filtered out by the filter device and is processed further by the devices downstream.

Figure 3B:
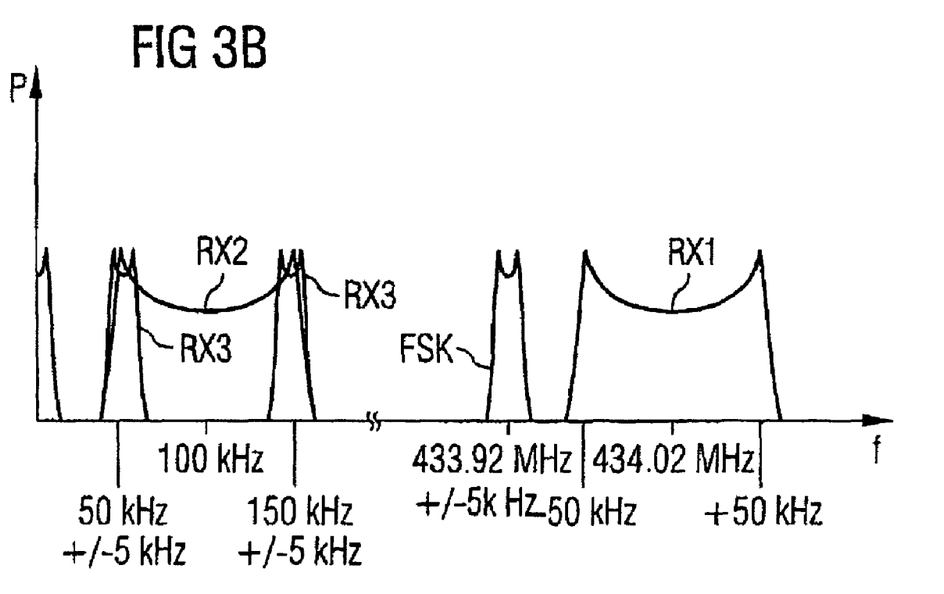

If modulated signals FSK are amplified by the amplification device instead of continuous signals CW, then received signals are converted to the amplification device's power supply in line with the spectrum shown in FIG. 3B. In this case, the transmission signal to be amplified comprises an FSK-modulated data signal at the transmission frequency 433.92 MHz and a frequency shift of +/−5 kHz. The signal RX1 which is received by the antenna and is applied to the output of the amplification device has the same spectral properties as the signal received in FIG. 3A. In addition to the conversion known from FIG. 3A, the spectrum in FIG. 3B has three further ranges, which have their origin in the conversion of the modulated transmission signal FSK to the supply current.

The AC component RX2 of the 50 or 150 kHz supply current, which AC component represents the received signal, has been modulated with a respective further alternating current RX3 which respectively changes the frequency of the received signal by plus or minus 5 kHz according to the data content of the signal which is to be transmitted. In addition, the DC component situated on the ordinate contains an AC component which modulates at +5 kHz and has the data content of the transmitted data FSK.

The great difference in the frequency shift and between the FSK which is to be transmitted and the received signal RX1 allows trouble-free demodulation and reconstruction of the transmitted data. This means that it is possible to transmit and receive simultaneously.

By applying a continuous unmodulated signal to the input of the amplification device, it is advantageously possible to produce an arrangement which receives a modulated signal but in so doing transmits only an unmodulated signal.

The inventive configuration is not limited to the transmission or reception of FSK data, but rather can be used for transmitting and receiving signals which have been digitally modulated in some way.

Figure 2:
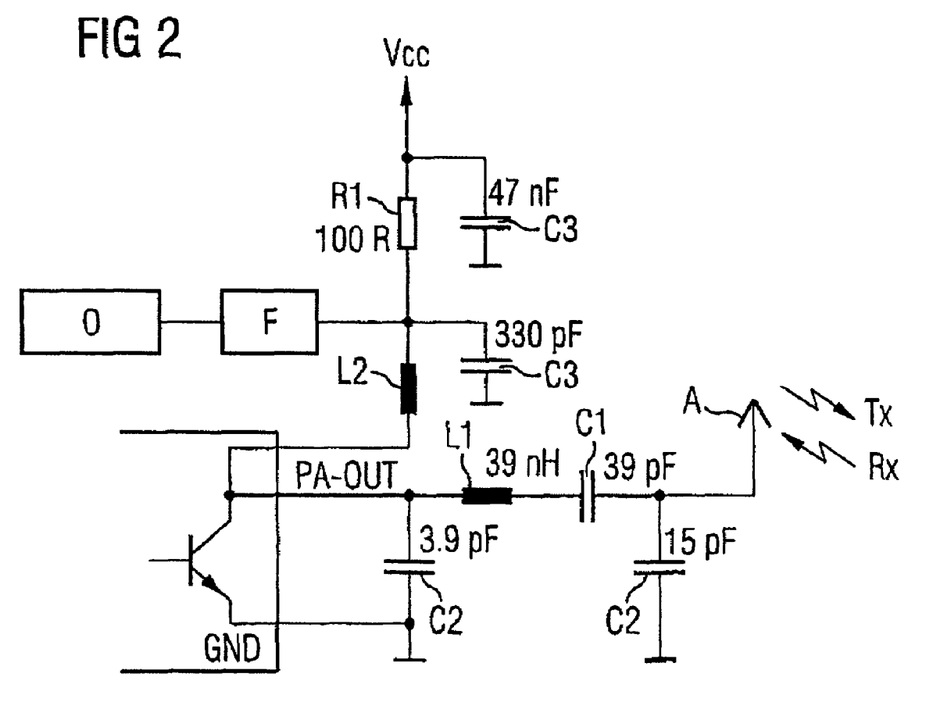
FIG. 2 shows an exemplary embodiment of the invention.

One specific embodiment of the frequency-converting amplification device is shown in FIG. 2. Identical elements have identical reference symbols. Their function will therefore not be described again.

The amplification device PA is designed in accordance with an ordinary arrangement which amplifies and transmits at a frequency of 434 MHz. Its collector output PA-OUT is connected to an antenna A via a coil L1 and a capacitor C1. The coil L1 and the capacitor C1 form, with two further capacitors C2, a matching network for matching the impedance of the collector output of the amplifier PA-OUT to the impedance of the antenna A. The emitter output of the amplifier GND is connected to ground. The power supply $V_{cc}$ is connected to the emitter output of the amplifier PA-OUT via a resistor R1 and a coil L2. Connected between the resistor R1 and the coil L2 is an evaluation device which, in the present case, is formed from a filter device and an amplifier F and also an oscilloscope O.

Upstream and downstream of the resistor R1, the supply line $V_{CC}$ has a respective capacitor C3 connected to it whose second connection is connected to ground. The capacitor C3 is a high-pass filter for the received signal converted to the power supply. The coil L2 is in the form of a low-pass filter and prevents any injection of the carrier frequency of 434 MHz. The resistor R1 serves as a current/voltage converter and maps the current drawn by the amplification device onto a voltage which is detected by the filter device F and the oscilloscope O as a voltage modulation. In this connection, an alternative configuration is to provide the circuit arrangement with a detection device which registers the modulation of the supply current. The illustrated values are an exemplary embodiment which can be used to implement the invention. The concept of the invention is not limited to the embodiment shown, but rather can be implemented for other amplification devices.

Figure 7:
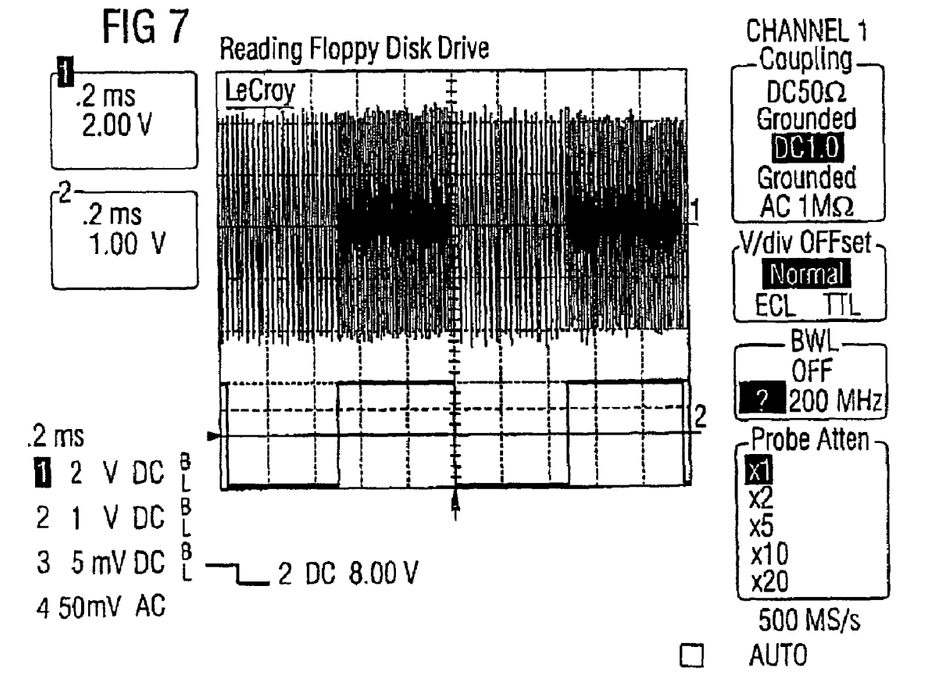
FIGS. 7, 8A and 8B show measurement results for various applications in the configuration shown in FIG. 2.

FIG. 7 shows an example of measurement of a received signal's frequency conversion to the supply voltage using the oscilloscope. In this case, a second transmitter transmits an FSK-modulated square-wave signal at a data rate of 1 kHz, as can be seen in channel 2 of the oscilloscope in FIG. 7. Channel 1 of the oscilloscope shows the modulation of the supply voltage for the amplification device, which corresponds to the data content of the received signal. In this case, the modulation of the voltage supply is 50 kHz, in line with a frequency shift of −50 kHz for one digital state of the originally received data signal or 150 kHz in line with +50 kHz frequency shift for the other state.

The modulated signal transmitted by the amplification device, having a frequency shift of 5 kHz, has no influence on the reception quality in this case. Besides the inventive configuration for simultaneously transmitting and receiving digitally modulated signals, other application options can be found which use the inventive feature of converting a signal, which is received by an antenna and is routed to the output of an amplification device, to a supply current for the amplification device using the amplification device.

By way of example, it is possible to use the amplification device to transmit a signal to a second object via the antenna. The object reflects a portion of the signal back to the amplification device, where information is transferred on account of a different reflection behavior for the object. The wave reflected back interferes with the preceding signal at the output of the amplifier and thus produces a modulation for the supply current. Possible forms of an object which changes its reflection behavior on the basis of the information to be transferred which may be mentioned are pressure or temperature sensors.

Figure 5:
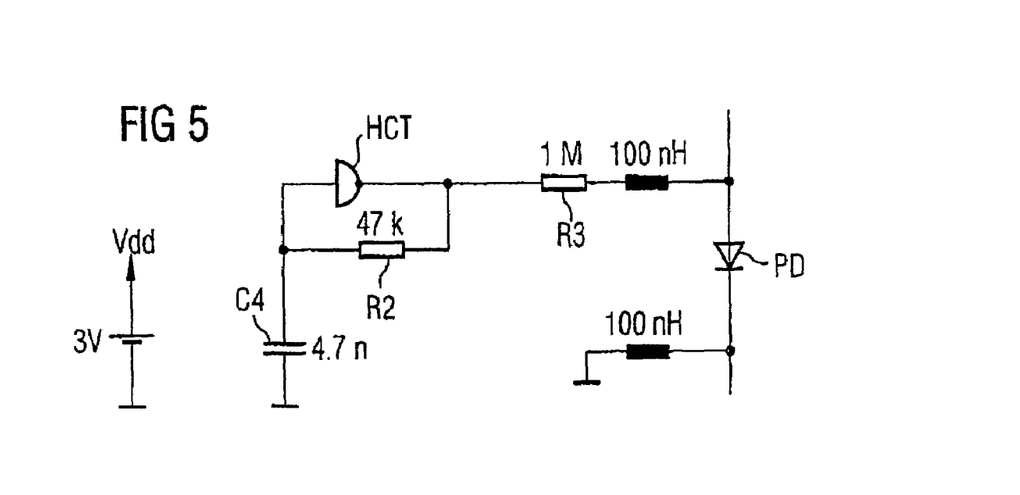
FIG. 5 shows a configuration of a test object changing over time.

One specific embodiment is shown in FIG. 5. This object produces a square-wave signal at a frequency of 1 kHz by virtue of the design of an inverter HCT with a Schmitt trigger input characteristic, which forms an RC oscillator together with the resistor R2 and the capacitor C4. The duty ratio of the square-wave signal is below 50%. When there is a "high" at the output of the oscillator, a small current flows via the resistor R3, which shifts the impedance of the pin diode PD in the direction of low impedance. This changes the reflection behavior of the diode at 1 kHz. It is possible to dispense with an operating current for purely passive objects and instead to take the necessary energy from the available transmission field, or to achieve the impedance change by changing other parameters.

It is also conceivable to achieve a reflection change using purely passive elements, which react only to external influences such as changes in temperature, in air pressure or in air composition.

Figure 6:
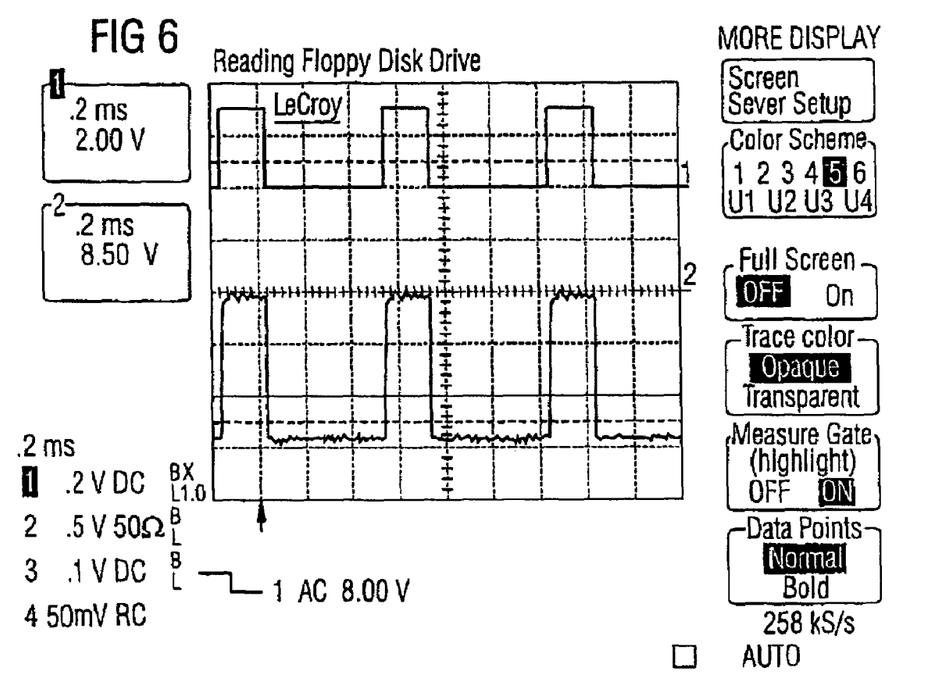
FIG. 6 shows a measurement result for a received signal in an exemplary embodiment.

If the inventive configuration shown in FIG. 2 transmits an unmodulated signal via the antenna to the object, then the reflection behavior causes the amplitude and phase of the signal which is reflected back to change. This results in modulation of the supply current as shown in FIG. 6, channel 2. In this case, channel 1 in FIG. 6 shows the square-wave signal for the object.

Another advantageous configuration of the invention is when it is in the form of a transmitting and receiving station for detecting movement in a space. In this context, the amplification device transmits a signal via the antenna to an area which is covered by the antenna. If the area covered contains no moving objects, then a fixed field distribution is established within the area and hence a fixed supply current for the supply device.

By moving an object within the area, a reflection behavior causes the field distribution to change, which results in a change in the supply current for the amplification device.

Figure 8A:
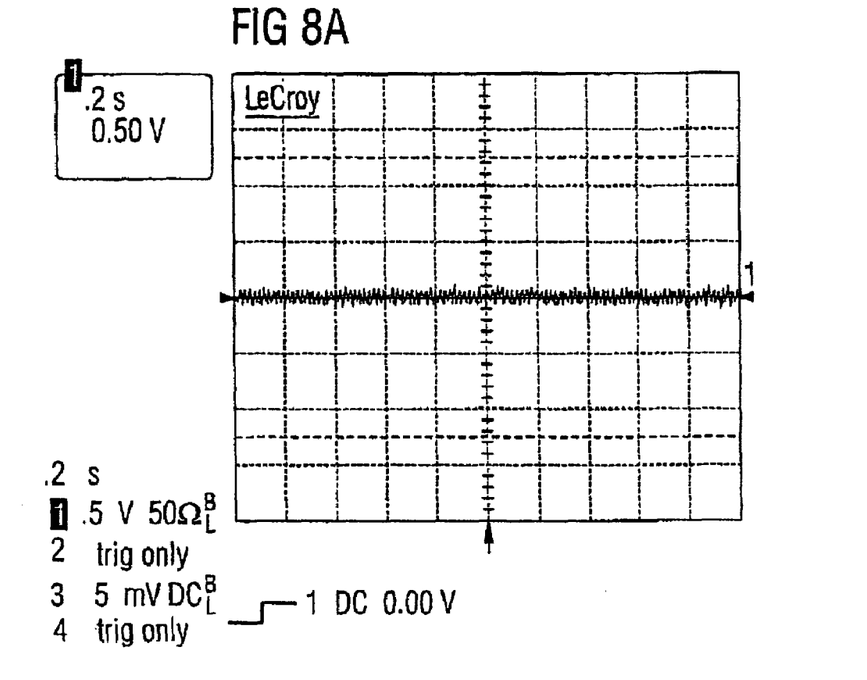
Figure 8B:
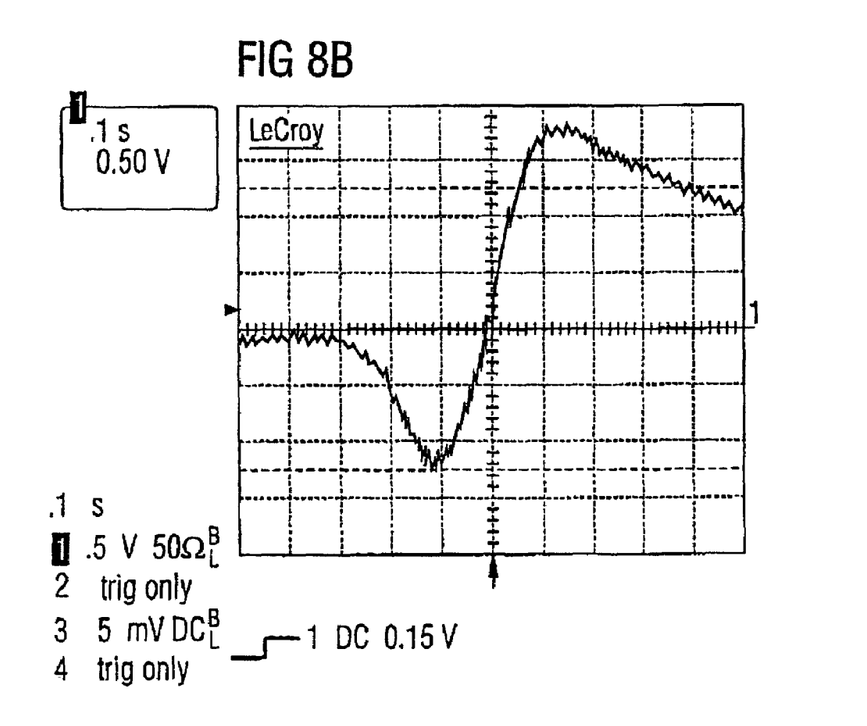

A test in such a configuration in line with the invention is shown in FIG. 8 using the time profile for the supply current. FIG. 8A shows the time profile for the supply current in the amplification device, where no movement is taking place within the area covered by the antenna. In FIG. 8B, a hand has moved slightly in the area covered.

The core concept applies beyond the above-described exemplary embodiments of simultaneous transmission and reception of signals. For example, the invention can be used in an arrangement which is designed for nonsimultaneous transmission and reception operation.

Although exemplary embodiments of the invention are described above in detail, this does not limit the scope of the invention, which can be practiced in a variety of embodiments.

What is claimed is:

1. A circuit arrangement for transmitting and receiving radio signals, comprising:
    an amplification device including an output terminal for transmitting signals, and a supply terminal; and
    an antenna for transmitting and receiving signals, the antenna connected to the output of the amplification device;
    wherein a signal received by the antenna is provided to the output terminal of the amplification device, and wherein the amplification device is configured to convert the signal into a converted signal received at the antenna and passed therethrough via the amplifier output terminal and provide the converted signal to the supply terminal of the amplification device.

2. The circuit arrangement of claim 1, wherein the amplification device includes a supercritical power amplifier in a C-E mode of operation.

3. The circuit arrangement of claim 2, including a device coupled to the supply terminal configured to detect and demodulate the converted signal.

4. The circuit arrangement of claim 2, wherein the converted signal is a modulated supply current.

5. The circuit arrangement of claim 4, including a device coupled to the supply terminal configured to detect and demodulate the converted signal.

6. The circuit arrangement of claim 2, wherein the converted signal is a modulated voltage drop on the supply terminal.

7. The circuit arrangement of claim 6, including a device coupled to the supply terminal configured to detect and demodulate the converted signal.

8. The circuit arrangement of claim 1, wherein the converted signal is a modulated supply current.

9. The circuit arrangement of claim 8, including a device coupled to the supply terminal configured to detect and demodulate the converted signal.

10. The circuit arrangement of claim 1, wherein the converted signal is a modulated voltage drop on the supply terminal.

11. The circuit arrangement of claim 10, including a device coupled to the supply terminal configured to detect and demodulate the converted signal.

12. The circuit arrangement of claim 1, including a device coupled to the supply terminal configured to detect and demodulate the converted signal.

13. The circuit arrangement of claim 1, wherein a transmission rate associated with signals transmitted by the amplification device is different than a reception rate associated with signals received by the amplification device.

14. The circuit arrangement of claim 1, provided as a transceiver of FSK-modulated data.

15. The circuit arrangement of claim 1, wherein the amplification device is for transmitting an outgoing signal via the antenna to an object whose reflection behavior changes over time, and wherein the amplification device is further for monitoring the converted signal during said transmission of the outgoing signal to detect a change in the object over time.

16. The circuit arrangement of claim 1, wherein the amplification device is for transmitting an outgoing signal via the antenna into a spatially limited area, and wherein the amplification device is further for monitoring the converted signal during said transmission of the outgoing signal to detect a change within the area over time.

17. The circuit arrangement of claim 1, operable for transmitting and receiving radio signals nonsimultaneously.

18. A method for frequency conversion in an amplification device having a supply terminal for a supply current, a signal input terminal and a signal output terminal, the amplification device comprising a portion of a circuit, the circuit configured to transmit and receive radio signals in a substantially concurrent manner, comprising:
    applying a first signal to the signal input terminal of the amplification device with nondiminishing amplitude, wherein the first signal is a transmission signal of the amplification device;
    applying a second signal to the signal output terminal of the amplification devices, wherein the second signal is a signal received at the antenna and passed therethrough via the amplifier output terminal by the amplification device; and converting the second signal applied at the signal output terminal into a converted signal comprising a supply current on the supply terminal via the amplification device, wherein the amplification device is operating in a supercritical range.

19. The method of claim 18, including monitoring the supply current over time to detect movement in a 3-dimensional area.

20. The method of claim 18, including monitoring the supply current over time to detect a change in an object over time.

21. The method of claim 18, wherein converting the second signal into the supply current further comprises converting the second signal into a modulation of the supply current.

22. A transceiver arrangement comprising:
   an amplifier comprising an output terminal and a supply terminal, the supply terminal configured to receive a supply voltage;
   an antenna configured to transmit and receive signals, wherein the antenna is connected to the output terminal of the amplifier; and
   a demodulator with an input terminal configured to demodulate a signal provided at the input terminal, wherein the input terminal of the demodulator is coupled to the supply terminal of the amplifier, wherein the amplifier is configured to convert a signal received at the antenna and passed thereto via the amplifier output terminal, and provide the converted signal as a supply signal at the supply terminal of the amplifier.

23. The transceiver arrangement of claim 22, further comprising a filter configured to suppress a DC-portion of the converted signal, wherein the filter is arranged between the input terminal of the demodulator and the supply terminal of the amplifier.

* * * * *

UNITED STATES PATENT AND TRADEMARK OFFICE
CERTIFICATE OF CORRECTION

PATENT NO. : 7,349,678 B2  Page 1 of 1
APPLICATION NO. : 10/784132
DATED : March 25, 2008
INVENTOR(S) : Anton Salfelner It is certified that error appears in the above-identified patent and that said Letters Patent is hereby corrected as shown below:

Column 6, Line 64, Claim 18; please replace the word "devices" with --device--

Signed and Sealed this

Fifteenth Day of July, 2008

JON W. DUDAS
*Director of the United States Patent and Trademark Office*